Nov. 28, 1939.　　　　C. IVERSON　　　　2,181,273
VULCANIZING PRESS
Filed Oct. 23, 1936　　　4 Sheets-Sheet 4

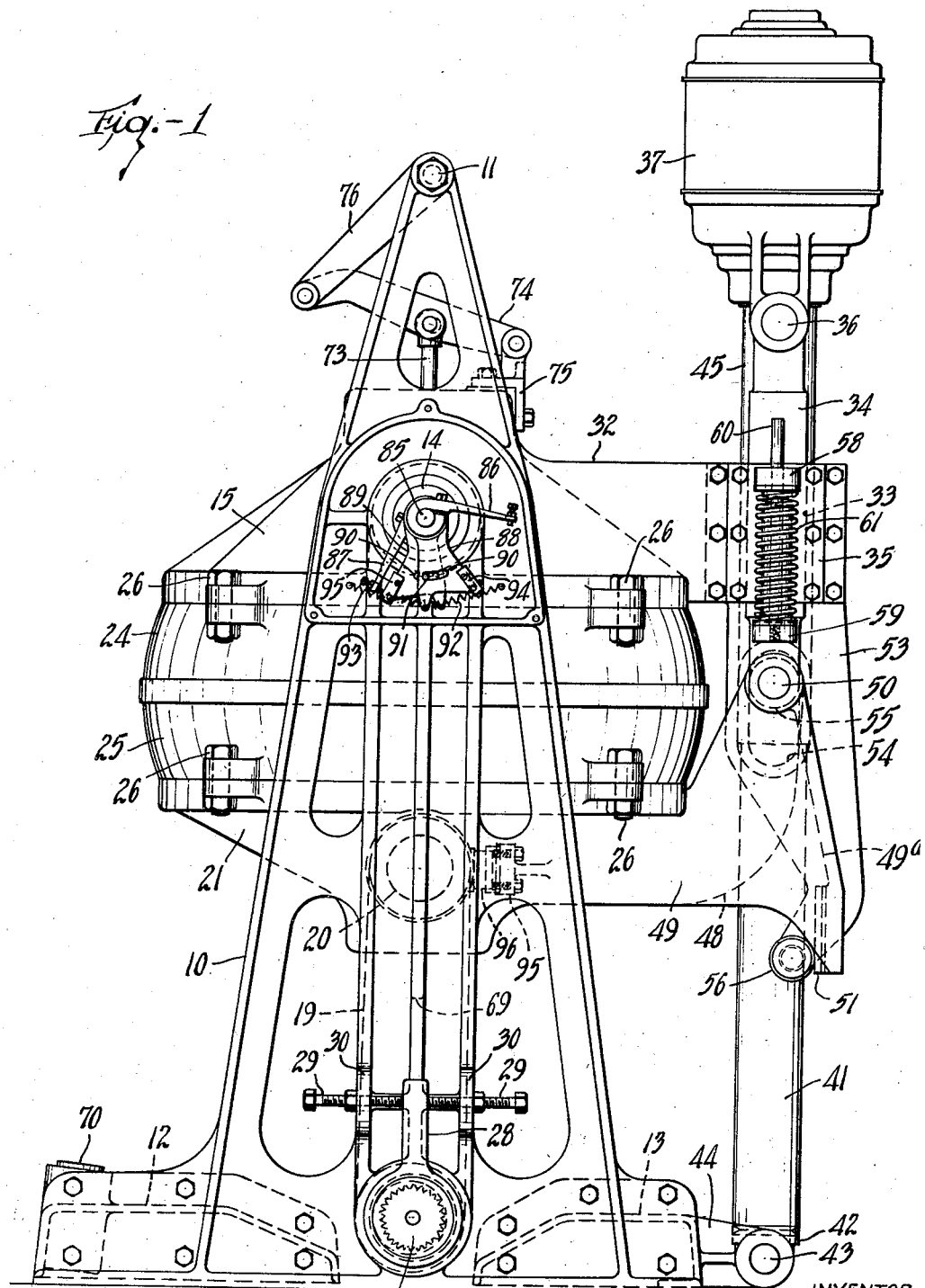

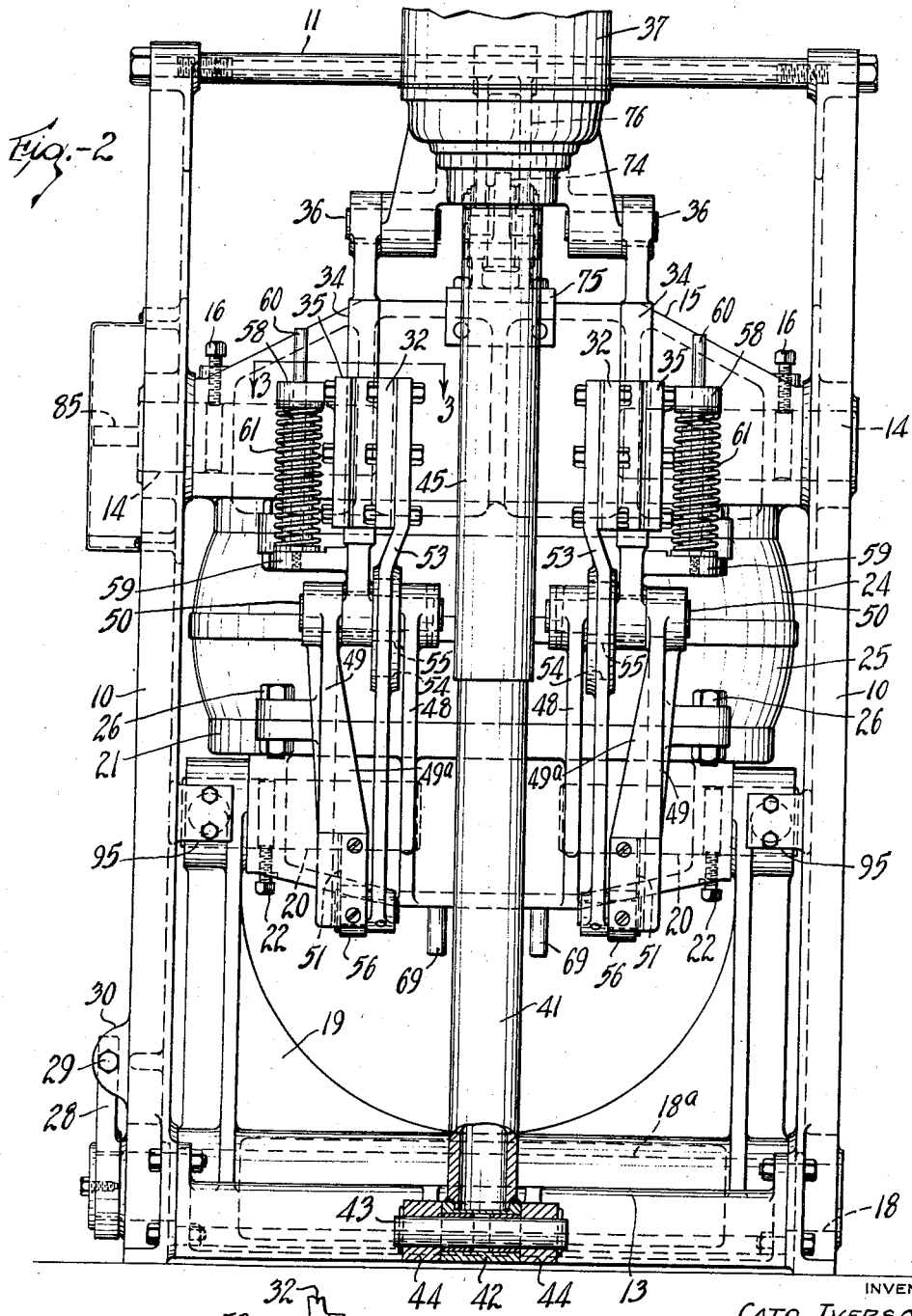

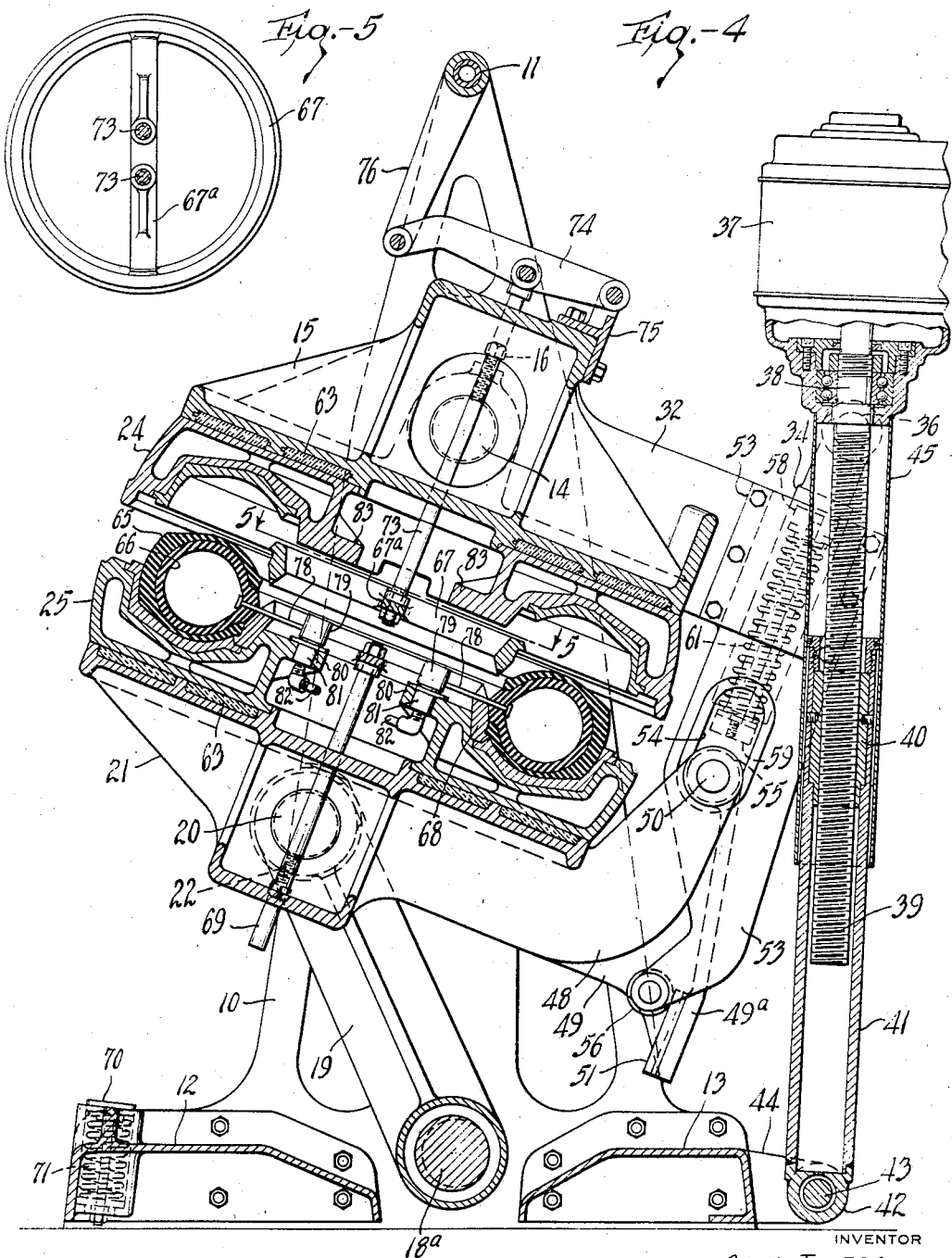

INVENTOR
CATO IVERSON
BY Albert L. Ely
ATTORNEY

Patented Nov. 28, 1939

2,181,273

UNITED STATES PATENT OFFICE 2,181,273

VULCANIZING PRESS

Cato Iverson, Akron, Ohio, assignor to National Rubber Machinery Company, Akron, Ohio, a corporation of Ohio Application October 23, 1936, Serial No. 107,131

13 Claims. (Cl. 18—17)

This invention relates to vulcanizing presses, and more especially it relates to vulcanizing presses of the so-called watchcase type that commonly are used in the rubber industry for the vulcanizing of pneumatic tire casings, inner tubes, and the like, and mechanical rubber goods.

The invention includes the fundamental features of the vulcanizer constituting the subject matter of my United States Patent No. 2,058,233, issued October 20, 1936, but is an improvement thereover in the provision of means for maintaining the upper and lower mold sections in parallelism during the intial opening movement and final closing movement of the press, and in the provision of means for utilizing the tilting movement of the upper press head for effecting the ejection of the work from the upper mold section.

The chief objects of the invention are to avoid the possibility of "pinching" the unvulcanized article in the mold during the closing of the latter; and to provide simple and efficient means for breaking the seal between the upper mold section and the work, as the press opens, to assure the retention of the finished work in the lower mold section. Other objects will be manifest as the specification proceeds.

Of the accompanying drawings,

Fig. 1 is a side elevation of a vulcanizing press, embodying the invention in its preferred form, in closed or operative condition;

Fig. 2 is a rear elevation thereof, a part being broken away and a part being in section;

Fig. 3 is a section on the line 3—3 of Fig. 2;

Fig. 4 is a central vertical section through the press, the press being partly open and the mold sections and press heads being in parallelism;

Fig. 5 is a section on the line 5—5 of Fig. 4; and

Figure 6:
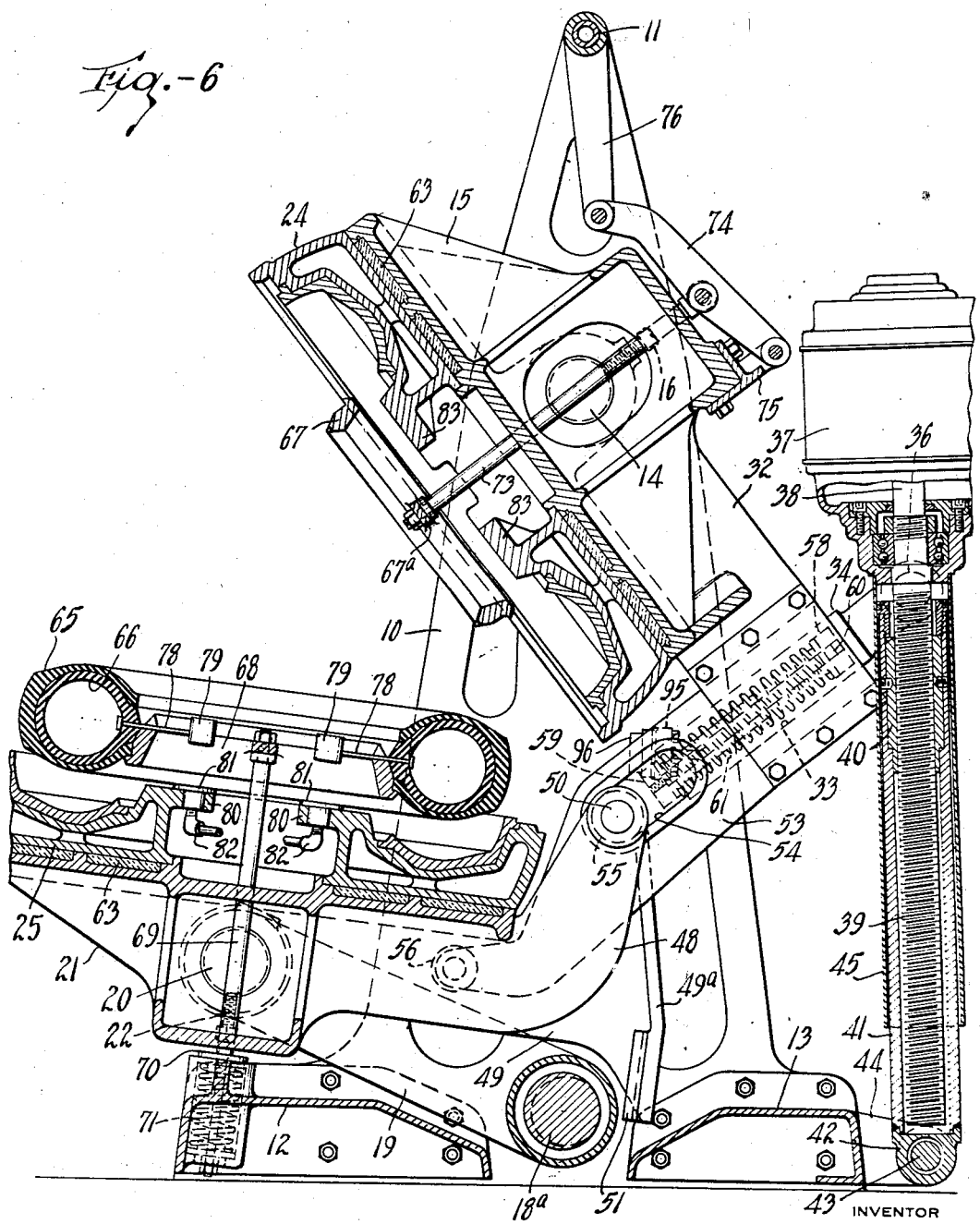
Fig. 6 is a section similar to Fig. 4 showing the press in fully open, inoperative position.

Referring to the drawings, it will be seen that the improved press comprises a pair of spaced-apart, upstanding, side frames 10, 10 that are connected at their tops by a hollow tie rod 11, and are connected at their bottoms by a front transverse spacer member 12 and a rear transverse spacer member 13. Journaled in the side frame 10, near the top thereof, are respective axially aligned stub shafts 14, 14 upon which is mounted an upper press head 15, axial movement of the shafts relatively of the press head being prevented by means of cap screws 16, 16 that are mounted in the press head and extend into circumferential grooves in the respective stub shafts. Journaled at its respective ends in the side frames 10, near the bottom of the latter, is a horizontal shaft 18, of which the medial portion 18a, between said frames, is eccentric with relation to the end journals thereof. Journaled upon said eccentric portion 18a of shaft 18 is a forked arm or link 19 that has a pair of opposed stub shafts 20, 20 journaled in its free end portion, and a lower press head 21 is mounted upon said stub shafts and secured thereto by cap screws 22, 22. Mounted upon the adjacent faces of the upper and lower press heads 15 and 21 are the respective mating halves or sections 24, 25 of an annular, two-part, steam-jacketed cavity mold, shown herein as a tire mold, although other similar types of molds may be employed. The mold sections may be secured to the press heads in any desired manner, as by means of bolts 26, 26. The shafts 14, 18 hereinbefore mentioned are parallel to each other, and, as shown, are in the same vertical plane.

The eccentricity of the shaft 18 is utilized for effecting a perfect and tight mating of the mold sections 24, 25 in the closed position of the press, and to this end means is provided for turning said shaft angularly whereby the lower head 21 and mold section 25 thereon are moved toward or away from the upper mold section 24. Said means comprises a crank or lever 28 that is secured upon one end portion of the shaft 18 that projects beyond frame 10 (see Figure 2), said crank extending upwardly and being engaged on opposite sides by adjusting screws 29, 29 that are threaded through respective ears 30 formed on reinforcing ribs on the outer face of said frame. The shaft 18 and crank 28 are formed with interengaged parallel knurling or teeth whereby relative movement between the members normally is prevented but relative angular adjustment is permitted. The arrangement is such that the press is adapted to utilize a large number of molds, notwithstanding slight variations in the thickness of the molds.

The upper press head 15 and the lower press head 21 are connected to each other by means comprising a lost motion hinge, and power means is connected to the lower head through the agency of the hinge pin for swinging said lower head upon the link 19, the lost motion of the hinge permitting the upper head to move angularly about its pivot on shafts 14 independently of the movement of the said pivot pin, and other means being provided for translating the angular movement of the lower press head to the upper press head in such a manner as to maintain said heads in parallelism until the entire lost motion of the hinge is utilized.

To this end the upper press head 15 is formed with a pair of parallel, rearwardly extending bracket arms 32, 32 disposed on opposite sides of the central fore and aft plane of the press, each of said arms being formed in its outer lateral face with a slideway 33 (see Figure 3) that is parallel to the axis of the press head. Slidably mounted in each slideway 33 is a pitman 34 that is retained therein by a cover plate 35 secured to the bracket arm over said slideway. Swiveled upon hinge pins 36 carried in the upper ends of the respective pitmans 34 is an electrical motor 37, the drive shaft 38 of which is an elongate member that extends downwardly and is threaded exteriorly of the motor so as to constitute a screw 39. The latter is threaded through a nut 40 that is non-rotatably mounted in the upper end portion of a tubular sleeve 41. The lower end of the sleeve 41 is provided with a bearing member 42 that is journaled upon a hinge pin 43 carried by a pair of brackets 44, 44 that are formed on the rear spacer member 13 and extend rearwardly therefrom. A tubular guard sleeve 45 is removably secured to the frame of the motor 37 and is telescopically arranged about the upper end portion of sleeve 41, to protect that portion of screw 39 that is disposed above the upper end of sleeve 41. The motor 37 is of the reversible type, and rotation of its shaft 38 and screw 39 will cause the motor alternatively to move from or toward the fixed point represented by the hinge pin 43, and such movement of the motor causes longitudinal movement of the pitmans 34, in their slideways 33, relatively of the upper press head.

The lower press head 21 is formed with two pairs of rearwardly extending bracket arms, which pairs are disposed on opposite sides of the central fore and aft plane of the press, the inner bracket arm of each pair being designated 48 and the outer bracket arm being designated 49. The rear end of each bracket arm 48, 49 is extended upwardly, and fixedly secured in the upper extremity of each pair of said arms is a hinge pin 50. The outermost bracket arm 49 of each pair is formed with a lateral flange 49a that extends laterally toward the arm 48 and downwardly to a point below the lowest extremity of said arm 48, the lowermost portion of said flange carrying a flat, metal wear plate 51 on its forwardly presented side, which wear plate is disposed in vertical position when the press is closed, as shown in Fig. 1. The lowermost ends of the pitmans 34 are pivotally connected to the respective hinge pins 50 as is most clearly shown in Fig. 2.

Secured to the inner lateral face of each bracket arm 32, at the rear extremity thereof, is a downwardly extending arm 53 that is formed with a longitudinally extending slot 54 through which a hinge pin 50 extends, said hinge pin having a roller 55 journaled thereon, which roller rides in said slot. The arms 53 are parallel to each other and are disposed in planes that are parallel to the fore and aft plane of the press, and each is positioned between a pitman 34 and a bracket arm 48. The lower end portion of each arm 53 is somewhat angular in profile, and at its extremity there is journaled a laterally extending roller 56 that is engageable with the adjacent wear plate 51 of a bracket arm 49, for a purpose subsequently to be explained. In the closed position of the press, the roller 56 engages the wear plate 51 substantially at the lower end of the latter.

As is most clearly shown in Fig. 2, the upper end portion of each cover plate 35 and slideway 33 is formed with a laterally outwardly extending ear 58, and the lower end portion of each pitman 34, below its slideway 33, is formed with a similar ear 59 in vertical alignment therewith. Each ear 58 is apertured so as slidingly to receive a guide-rod 60 carried by each ear 59, and mounted between said ears, around said guide rods, are respective compression springs 61. The function of the latter is to urge the upper press head 15 relatively of the pitmans 34 in a manner and for a purpose presently to be explained.

As hereinbefore stated, the mold sections 24, 25 are of the usual steam jacketed type, and suitable piping (not shown) is provided for conducting steam thereto and for conducting steam and condensate therefrom. Provision is made for mounting heat-insulating material, such as asbestos composition 63, between the adjacent faces of the mold sections 24, 25 and the respective press heads 15, 21 to prevent the dissipation of mold-heat by conduction through said press heads.

The molding cavities of the mold sections 24, 25 are shaped to receive an annular, pneumatic tire casing 65, the latter being provided with the usual expansible core 66 for furnishing the necessary internal pressure during vulcanization of the tire. The inner perimeters of the molding cavities are recessed to receive the respective annular sections of a bead clamping ring or "clip ring" of which the upper section is designated 67 and the lower section is designated 68. The lower bead clamping ring section is mounted upon the upper ends of a pair of parallel guide rods 69, 69 that extend downwardly through suitable apertures formed in the lower press head 21, and project from the bottom of the latter. The guide rods 69 are axially slidable in said apertures, whereby they are adapted to move the bead ring 68, relatively of the mold section 25 in an axial direction, but prevent any angular movement of said bead ring. The guide rods 69 project sufficiently below the press head 21 to engage respective yielding abutments, such as the abutment 70 mounted in a socket formed on the top of the front spacer member 12, when the press is in the open position shown in Fig. 6. The abutment 70 is backed by a compression spring 71 mounted in said socket. Preferably the press head 21 will be slightly spaced from the abutment 70 in the fully opened position of the press shown in Fig. 6, but said press head may engage said abutment if the motor 37 overruns or coasts past its stopping position during the opening of the press. The arrangement is such that when the guide rods 69 engage the abutments 70 said guide rods are moved upwardly relatively of the mold section 21, so that the bead ring 68 with tire 65 thereon is lifted a substantial distance above the mold section 25.

It is desirable, in the opening of the mold, that the vulcanized tire therein remain in the lower mold section 25, and to this end it is customary to apply a lubricant, such as soap, to the upper molding cavity before starting each vulcanizing operation. In addition, the present invention includes means for moving the upper bead ring 67 axially out of its seat, during the initial opening movement of the press, so as positively to eject the finished tire 65 from the upper molding cavity. To this end the bead ring 67 is formed with a diametric rib 67a to which is connected the lower ends of a pair of guide rods 73, 73 that support said bead ring, said guide rods extending upwardly through suitable apertures formed in the upper press head 15 and having their upper ends connected to the medial region of a lever 74 that is disposed in the fore and aft medial plane of the press. The lever 74 is a lever of the second class, and is pivotally mounted at its rear end upon a bracket 75 mounted atop of the upper press head 15. The forward end of the lever 74 is pivotally connected to a link or bifurcated arm 76 that is journaled upon the tie rod 11 and extends downwardly therefrom. The arrangement is such that during the operation of opening the press, whereby the upper press head 15 swings about its axis on the stub shafts 14 from the horizontal position shown in Fig. 1 to the oblique position shown in Fig. 6, the link 76 is moved from an oblique position to a substantially vertical position and thereby moves the forward end of the lever 74 downwardly with relation to the press head, with the result that the guide rods 73 are moved downwardly in the press head and the upper bead ring 67 is moved axially away from the upper mold section 24 to assure separation of the tire 65 from the latter. The movement of the bead ring is reversed during the closing of the press.

During vulcanization, the tire 65 is expanded by fluid pressure, usually water at vulcanizing temperature, that is circulated within the expansible core 66. To this end the latter is provided, at diametrically opposite points of its inner periphery, with valve stems 78, 78 that have their ends, exteriorly of the core structure, provided with respective coupling members 79 of known construction. The bead rings 67, 68 are suitably slotted to receive the valve stems 78, the arrangement assuring that the valve stems always will be determinately positioned in the vulcanizer. Mounted in respective lugs 80 projecting radially inwardly from the inner periphery of lower mold section 25 are coupling members 81, 81 that have fluid-tight engagement with coupling members 79 when brought into face to face engagement therewith. Coupling members 81 are connected to suitable pipe lines 82, 82 extending to a source of fluid pressure (not shown). Radial lugs 83, 83 are formed on the inner periphery of the upper mold section 24 and are adapted, in the closed position of the press, to engage the coupling members 79, 79 and to force them against the respective coupling members 81, whereby a fluid-tight connection between the coupling members is assured.

The motor 37 is operated from any suitable source of electrical power, and manually operated starting switches (not shown) are provided for starting the motor in either of its alternative positions, to open or close the press. The operative cycles of the motor automatically are terminated when the press attains its fully open or fully closed position, and to this end a suitable limit switch is provided. As shown in Fig. 1, said limit switch comprises a stud 85 that is mounted axially upon the outer end face of one of the stub shafts 14, said stud having a pair of radial contact arms 86, 87 secured thereon at an angle to each other. Swiveled upon the stud 85, in axially spaced-apart relation, are limit switch members 88, 89, each of which is formed with an arcuate slot 90 that is concentric with the stud 85. A pin 91 that extends through the respective slots 90 and is fixed in the frame 10 limits angular movement of the members 88, 89. The switch members 88, 89 normally are yieldingly maintained in determinate angular position with relation to each other by respective tension springs 92, 93 that are connected to the respective members 88, 89 and to fixed points on the frame 10. The members 88, 89 carry respective electrical contacts 94, 95 that are engageable by the respective contact arms 86, 87 when the latter are turned angularly by rotation of the stub shaft 14 during the operation of the vulcanizer. Said electrical contacts are so arranged in the electrical circuit controlling motor 37 as to effect the cutting off of current to the latter when contacts 86, 94 engage each other or when contacts 87, 95 engage each other. The swivelling of the switch members 88, 89, against the tension of their springs 92, 93, allows for coasting of the stub shaft 14 after current to the motor 37 is cut off.

In the event of failure of the limit switch to stop motor 37, substantial overrunning is prevented by means of a pair of positive stops, one of which is the abutment 70 hereinbefore described that is engageable with the lower press head 21. The other positive stop comprises a pair of lugs 95, 95, one end of which projects inwardly from the inner face of each frame member 10, the front face of each lug having a resilient bumper of rubber 96 mounted thereon. The lugs 95 are so positioned that their bumpers 96 are engageable with the free end of arm 19, at opposite ends thereof, in a slightly over-center position of said arm in the closed position of the press.

The operation of the press is as follows. When the press is in its closed, operative position, the respective parts thereof are in the positions shown in Fig. 1. Assuming that the end of a vulcanizing cycle is reached, opening of the press is effected by pressing a starter button (not shown) to start operation of the motor 37, the latter rotating screw 39 in the direction which threads it axially downwardly through nut 40, with the result that motor 37 is drawn downwardly and with it the two pitmans 34 to which the motor is pivotally connected. Downward movement of the pitmans 34 tilts the lower press head 21 upon its pivots on stub shafts 20 and also effects a tilting of the arm 19. During the initial downward movement of the pitmans 34, said pitmans slide in their slideways 33 relatively of the upper press head 15, and the rollers 55 on the hinge pins 50 at the lower end of the pitmans move downwardly in the slots 54 of the arms 53. Thus the only force applied to the upper press head 15 at this time is derived from the movement of the lower press head 21 through the agency of the bracket arm 49, wear plate 51, roller 56 and arm 53, the spring 61 maintaining the roller 56 in engagement with said wear plate 51 and the press heads remaining in parallelism as long as said roller and wear plate are engaged. Angular movement of the arm 19 about its pivot on shaft 18 causes the lower press head to move downwardly away from the upper press head during the concurrent tilting of the press heads as described, the roller 56 moving longitudinally along wear plate 51 as the press heads move apart, as is shown in Figure 4.

Concurrently with the tilting of the upper press head 15 and as the result thereof, the arm 76 is moved angularly toward vertical position and thereby forces the guide rods 73 and upper bead clamping ring 67 downwardly relatively of the upper press head and mold section, through the agency of the lever 74. This movement of the upper bead ring forcibly ejects the finished tire 65 from the upper mold section 24 and assures that it remains in the lower mold section 25.

The separation of the mold sections 24, 25 while in parallelism continues until the rollers 55 on the ends of the pitmans 34 reach the lower ends of the slots 54, the mold sections then being separated a distance of substantially four inches. Thereafter relative movement between the upper press heads and the pitmans ceases, the latter then applying force to the upper press head directly through the rollers 55 and the depending arms 53, the said rollers and the hinge pins 50 moving in an arc about the stub shafts 14 as an axis, and the upper and lower press heads moving angularly relatively of each other about the hinge pin 50 as an axis. During the aforesaid relative angular movement of the press heads, the rollers 56 are moved forwardly away from the wear plate 51. Because the lower press is mounted on the free end of the arm 19, there is imparted thereto a swinging movement that carries it to the ultimate position shown in Fig. 6 of the drawings.

As the lower press head approaches the fully open position shown in Fig. 6, the lower ends of the guide rods 69 engage the respective abutments 70 and stop, further opening movement of the press head being relatively of said guide rods and the lower bead ring 68 carried thereby, with the result that the lower mold section 25 moves downwardly away from said bead ring and the latter strips the tire 65 from the cavity of said lower mold section.

As the mold sections approach the fully open position shown in Fig. 6, contact member 86 of the limit switch makes contact with switch member 94 and thereby stops the operation of motor 36. Thereafter the finished tire 65, with expansible core 66 therein, may be removed from the press, and an unvulcanized tire with expansible core therein may be mounted therein in its stead.

To close the press it is only necessary to press the starter button again to set the motor in operation, this time in reverse direction whereby the screw 39 is threaded outwardly of the nut 40, and the motor 37 thereby moved upwardly, with the result that the movable elements of the press are returned to the closed position shown in Figs. 1 and 2 in reverse order to the manner of their opening, the mold sections being in parallelism in the final phase of the closing operation. The motor 37 ceases running when contact member 87 of the limit switch engages contact member 95 thereof. While the press is closed, vulcanization of the tire therein is effected. This completes a cycle of operation, which may be repeated as desired.

It will be observed in Fig. 1 that the roller 55 is not quite at the upper end of slot 54 in the closed position of the press. This additional length of slot is provided for the purpose of permitting the lower press head 21 to be raised and lowered slightly by means of the eccentric portion 18a of shaft 18, while said press head is maintained in parallelism with upper press head 15.

The press combines the desirable features of angularly opening mold sections, which provides ample space for loading and unloading the mold, and parallel movement of the mold sections in the final phase of their closing movement which prevents pinching or displacement of the work therein. The feature of maintaining the mold sections in parallelism during the initial phase of the opening of the press permits the use of an axially movable bead ring as a means for stripping the work from the upper mold section, and the tilting of the upper press head during opening and closing of the press is utilized in an improved manner for effecting axial movement of said bead ring.

Modification may be resorted to without departing from the spirit of the invention or the scope of the appended claims.

What is claimed is:

1. A vulcanizing press comprising a frame, a pair of movable press heads adapted to carry respective mating mold sections, one of said heads being pivoted directly to the said frame, means for moving said last mentioned head about its pivot and for imparting a swinging movement to the other head to effect opening and closing of the vulcanizer, and means comprising a lost motion connection between said press heads enabling them to maintain parallelism during at least a portion of their aforesaid movements.

2. A vulcanizing press comprising a frame, a pair of movable press heads adapted to carry respective mating mold sections thereon, one of said heads being pivoted directly to said frame, means for moving said last mentioned head angularly about its pivot and for concurrently imparting a swinging movement to the other head to effect opening and closing of the press, and means comprising a lost motion connection between said press heads enabling them to maintain parallelism during the initial opening movement of the press and during the final closing movement thereof.

3. A vulcanizing press comprising a frame, a pair of movable press heads adapted to carry respective annular, mating, tire-molding sections, one of said heads being pivoted directly to said frame and including a tire-bead-engaging ring within the mold section carried thereby, means for moving said last-mentioned head angularly about its pivot and for imparting a movement to the other press head to effect opening and closing of the press, means including a lost motion connection between the press heads for maintaining said press heads in parallelism during the initial opening movement of the press and during the final closing movement thereof, and means operated by the angular movement of said pivotally mounted head for effecting axial movement of said bead engaging ring, relatively of its mold section, to strip the work therefrom.

4. A vulcanizing press for tires, said press comprising a pair of press heads carrying respective annular tire-mold sections, the upper press head being pivoted directly to said frame upon a diametrically disposed axis, means for moving said upper press head angularly about its pivot in the opening and closing of the press, a tire bead engaging ring in the tire mold section carried by said upper press head, a pair of guide rods slidably mounted in said upper press head parallel to the axis of the mold section thereon and connected at one end to said bead ring, a lever to which the other ends of said guide rods are connected, and means for utilizing the angular movement of said upper press head to operate said lever and thereby to cause the bead ring to eject a finished tire from the upper mold section.

5. A vulcanizing press for tires, said press comprising a pair of press heads carrying respective annular mating tire-mold sections, the upper press head being pivoted directly to said frame, said pivot being disposed diametrically with relation to the press head, means for moving said upper press head angularly about its pivot in the opening and closing of the press, a tire bead engaging ring in the upper tire mold section, a pair of guide rods slidably mounted for longitudinal movement in said upper press head and connected at one end to said bead ring, a lever pivoted on said upper press head to which lever the other ends of the guide rods are connected, and an arm pivotally mounted on the frame and connected to said lever in such a manner that angular movement of the upper press head causes the guide rods to effect axial movement of the bead ring to eject a finished tire from the upper mold section.

6. A vulcanizing press of the character described comprising a frame, a pair of movable press heads carrying respective mating mold sections, one of said heads being pivoted directly to said frame, a pivoted arm connected between said frame and the other of said heads, power means for moving said heads angularly relatively of the frame to effect opening and closing of the press, and means including a lost motion connection between the heads for maintaining said heads in parallelism during a portion at least of their aforesaid relative movement.

7. A press of the character described comprising a frame and a pair of relatively movable press heads, one of the latter being a floating head and the other head being pivoted directly to the frame, a power member having pivotal connection with the floating press head and lost motion connection with the other press head, and interengaged means on said press heads whereby movement of the floating press head imparts movement to the other press head during the lost motion interval before the power member operatively engages the other press head.

8. A combination as defined in claim 7 wherein the interengaged means is so constructed and arranged as to maintain the press heads in parallelism during the lost motion movement of the power member.

9. A press of the character described comprising a frame and a pair of relatively movable press heads, one of the latter being a floating head and the other head being pivoted directly to the frame upon a diametrically disposed axis, a lost motion hinge connecting said press members, a power member connected to the hinge pin of the lost motion hinge and adapted to impart a swinging movement to the floating head, and a connection between said press heads through which movement of the floating press head applies a force to the other press head to tilt it upon its pivot, during lost motion movement of the hinge pin, while maintaining said press heads in parallelism.

10. A press of the character described comprising a frame and a pair of relatively movable press heads, one of the latter being a floating head and the other head being pivoted directly to the frame upon a diametrically disposed axis, a power member having pivotal connection with the floating press head adapted to impart a swinging movement thereto, said power member having lost motion connection with the other press head, respective means mounted on the two press heads and arranged for cooperation with each other whereby movement of the floating press head applies force to the other press head to tilt it upon its pivot, during the period of lost motion between the power member and said last mentioned press head, while maintaining said press heads in parallelism, and yielding means normally urging said cooperating means into engagement with each other during the lost motion phase of operation of the power member.

11. A press of the character described comprising a frame and a pair of relatively movable press heads, one of the latter being a floating head and the other head being pivoted directly to the frame upon an axis disposed diametrically of the head, a pitman having pivotal connection with the floating press head adapted to impart a swinging movement thereto, said pitman having lost motion connection with the other press head, power means for reciprocating said pitman, respective members mounted upon the two press heads and arranged for cooperation with each other whereby movement of the floating press head applies force to the other press head to tilt it upon its pivot during the period of lost motion between the pitman and said last mentioned press head, while maintaining said press heads in parallelism, and a compression spring between said pitman and the press head that is pivoted directly to the frame adapted to urge said cooperating members into engagement with each other during the lost motion movement of the pitman.

12. A press of the character described comprising a frame and a pair of annular, relatively movable, upper and lower press heads, the upper head being pivoted directly to the frame on a diametric axis and the lower head being pivotally mounted on the free end of a pivoted arm, a bracket arm on the lower press head formed with a surface that is parallel to the axis of the press head, a depending arm on the upper press head having a portion engageable with said surface, a pitman slidably mounted in said upper press head and having lost motion connection therewith, said pitman having one end pivotally connected to said lower press head, and power means for longitudinally moving said pitman.

13. A combination as defined in claim 12 including an expansible compression spring positioned between the pitman and the upper press head for retaining the depending arm of the latter in engagement with the bracket arm of the lower press head during the lost motion movement of said pitman relatively of the upper press head.

CATO IVERSON.